(12) United States Patent
Kuroiwa et al.

(10) Patent No.: US 8,443,629 B2
(45) Date of Patent: May 21, 2013

(54) METHOD FOR MANUFACTURING ULTRA-THIN GLASS SUBSTRATE

(75) Inventors: Yutaka Kuroiwa, Tokyo (JP); Seiki Ohara, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/366,854

(22) Filed: Feb. 6, 2012

(65) Prior Publication Data

US 2012/0131955 A1    May 31, 2012

Related U.S. Application Data

(63) Continuation of application No. PCT/JP2010/062443, filed on Jul. 23, 2010.

(30) Foreign Application Priority Data

Aug. 7, 2009 (JP) .................................. 2009-184592

(51) Int. Cl.
*C03B 23/37* (2006.01)
*C03B 23/037* (2006.01)

(52) U.S. Cl.
CPC .................................. *C03B 23/037* (2013.01)
USPC .............................................. 65/106; 65/90

(58) Field of Classification Search
USPC ...................................................... 65/90, 106
See application file for complete search history.

(56) References Cited

U.S. PATENT DOCUMENTS

| 3,622,298 | A | * | 11/1971 | Machlan et al. | .................. | 65/31 |
| 4,999,039 | A | * | 3/1991 | Itoi et al. | ............................ | 65/54 |
| 6,092,392 | A | * | 7/2000 | Verlinden et al. | .............. | 65/30.1 |
| 7,231,786 | B2 | * | 6/2007 | Cimo et al. | ......................... | 65/91 |
| 8,062,733 | B2 | * | 11/2011 | Hawtof et al. | ................ | 428/167 |
| 8,181,485 | B2 | * | 5/2012 | Coffey et al. | ..................... | 65/90 |
| 2006/0021385 | A1 | | 2/2006 | Cimo et al. | | |
| 2007/0178281 | A1 | | 8/2007 | Nakamura et al. | | |

(Continued)

FOREIGN PATENT DOCUMENTS

JP     2003-029664 A    1/2003
JP     2007-197280 A    8/2007

(Continued)

OTHER PUBLICATIONS

Notification of Reasons for Refusal Japanese Patent Application No. 2011-525851 dated May 15, 2012.

(Continued)

*Primary Examiner* — Joseph S Del Sole
*Assistant Examiner* — Russell Kemmerle, III
(74) *Attorney, Agent, or Firm* — Foley & Lardner LLP (57) ABSTRACT

The present invention relates to a method for manufacturing an ultra-thin glass substrate, the method including: a feeding step of feeding a preform for a glass substrate to a production line while being held; a heating step of heating the preform fed from the feeding step to a temperature around a softening point thereof; and a drawing step of drawing the preform that has softened in the heating step to form an ultra-thin glass substrate, in which the preform has been wound on a cylindrical first winding roll.

14 Claims, 2 Drawing Sheets

U.S. PATENT DOCUMENTS

| | | | |
|---|---|---|---|
| 2009/0267270 A1* | 10/2009 | Murakami et al. | 264/447 |
| 2010/0319401 A1* | 12/2010 | Coffey et al. | 65/106 |
| 2011/0177290 A1* | 7/2011 | Tomamoto et al. | 428/142 |
| 2011/0177325 A1* | 7/2011 | Tomamoto et al. | 428/332 |
| 2011/0177347 A1* | 7/2011 | Tomamoto et al. | 428/426 |
| 2011/0192878 A1* | 8/2011 | Teranishi et al. | 226/1 |
| 2011/0200812 A1* | 8/2011 | Tomamoto et al. | 428/220 |
| 2012/0017642 A1* | 1/2012 | Teranishi et al. | 65/105 |
| 2012/0131962 A1* | 5/2012 | Mitsugi et al. | 65/112 |
| 2012/0237779 A1* | 9/2012 | Teranishi et al. | 428/426 |

FOREIGN PATENT DOCUMENTS

| | | |
|---|---|---|
| JP | 2008-508179 A | 3/2008 |
| JP | 2010-132532 A | 6/2010 |
| WO | WO 2006/070527 A1 | 7/2006 |

OTHER PUBLICATIONS

Handbook of Glass Engineering (Garasu Kogaku Handobukku), Asakura Publishing co., Ltd., 1999, p. 419.

* cited by examiner

METHOD FOR MANUFACTURING ULTRA-THIN GLASS SUBSTRATE

TECHNICAL FIELD

This technique relates to a method for manufacturing an ultra-thin glass substrate having a thickness of 50 μm or less which is for use in producing display devices, electronic papers, touch panels, integrated semiconductor circuits, MEMSs, organic EL illuminators, etc.

BACKGROUND ART

As a method for manufacturing a thin glass substrate having a thickness of 1 mm or less, a float process, fusion process, slot downdraw process and re-drawing process have been used.

In the float process, a molten glass is caused to float on molten tin and the width of the molten glass is increased, while holding both width-direction ends of the molten glass, to produce a glass substrate. However, the equilibrium thickness of the molten glass on the molten tin exceeds 4 mm, and it is necessary, for manufacturing a thin glass substrate having a thickness of 4 mm or less, to more strongly pull both width-direction ends of the molten glass to further increase the width of the molten glass. It is therefore extremely difficult to produce a thin glass substrate having an even thickness throughout. The limit of thickness for thin glass substrates produced by the float process is about 0.3 mm.

In the fusion process, a molten glass is poured into a trough and caused to overflow the trough, and a thin glass substrate is produced while drawing downward the molten glass fused together under the trough. For manufacturing a thin glass substrate, it is necessary to properly balance the tension at which the molten glass is drawn downward with the transverse-direction tension for holding the molten glass. In case where these tensions are poorly balanced, the resultant thin glass substrate has a large deviation in thickness and has undulations. The limit of thickness for thin glass substrates produced by the fusion process is about 50 μm.

In the slot downdraw process, a molten glass is poured into a trough and a thin glass substrate is produced while the molten glass which flows out through the slot formed in the bottom of the trough is being cooled and drawn downward by gravity and downward tension. Since the temperatures in the step of downward drawing range from a temperature range for low viscosity to a temperature range for substantially solid states, it is difficult to control deformation of a thin glass substrate in such a wide temperature range. The limit of thickness for thin glass substrates produced by the slot downdraw process is about 0.1 mm. Furthermore, since the surfaces of the thin glass substrate were in contact with the slot, the thin glass substrate is apt to be affected by the shape and material of the slot. The slot downdraw process hence has a drawback that the thin glass substrate is apt to have impaired surface quality.

In the re-drawing process, a glass substrate is sent downward while being held vertically, and the lower end of the glass substrate which has been sent downward is heated to a temperature around the softening point in a heating step, e.g., an electric furnace. The glass substrate which has thus softened is drawn downward to thereby produce a thin glass substrate. The cross-section of this thin glass substrate and that of the glass substrate which has not been heated (hereinafter referred to as "preform") are of similar shapes. Consequently, by using a preform having heightened dimensional accuracy, a thin glass plate also having high dimensional accuracy can be produced.

As a method for manufacturing by the re-drawing process, a process in which one preform sheet is heated and drawn to produce an ultra-thin glass substrate is described in patent document 1.

BACKGROUND ART DOCUMENTS

Patent Document

Patent Document 1: JP-T-2008-508179

Non-Patent Document

Non-Patent Document 1: Garasu Kōgaku Handobukku (Handbook of Glass Engineering), Asakura Publishing Co., Ltd., p. 419, 1999

SUMMARY OF THE INVENTION

Problems that the Invention is to Solve

In recent years, a technique in which a continuous thin glass substrate is wound into a roll form and supplied to a later step is being investigated (including a customer) in order to efficiently mass-produce electronic devices.

However, the manufacturing method disclosed in patent document 1 is batchwise, and the length of the ultra-thin glass substrate to be produced is limited according to the length of the preform. For example, in the case where a preform having a length of 1 m and a thickness of 0.1 mm is drawn into an ultra-thin glass substrate having a thickness of 10 μm, the length of the ultra-thin glass substrate that can be produced is 100 m at the most when the similarity ratio of the width-direction cross-sectional shape of the preform is taken as 10:1. It is impossible to produce a continuous ultra-thin glass substrate.

In the manufacturing method described in non-patent document 1, the upper end of a preform to be introduced into a heating step is heated and bonded, by a burner or the like, to the lower end of an adjoining preform to be introduced into the heating step, and the thermally bonded preforms are heated and drawn thereby producing a continuous ultra-thin glass substrate. However, when an end of a preform having a small thickness is thermally bonded to an end of another, there is a possibility that the local heating of the ends of the preforms might damage or deform the ends of the preforms. Even when the positioning of the ends of the preforms and the conditions for heating with a burner or the like are optimized, the steps for positioning and for thermal bonding requires time, resulting in a decrease in productivity.

Means for Solving the Problems

The present inventors diligently made investigations in order to overcome those problems, and have completed the invention.

Namely, the present invention relates to the following items (1) to (8).

(1) A method for manufacturing an ultra-thin glass substrate, the method comprising:
 a feeding step of feeding a preform for a glass substrate to a production line while being held;
 a heating step of heating the preform fed from the feeding step to a temperature around a softening point thereof; and a drawing step of drawing the preform that has softened in the heating step to form an ultra-thin glass substrate, wherein the preform has been wound on a cylindrical first winding roll.

(2) A method for manufacturing an ultra-thin glass substrate, the method comprising:

a feeding step of feeding a preform for a glass substrate to a production line while being held;

a heating step of heating the preform fed from the feeding step to a temperature around a softening point thereof; and a drawing step of drawing the preform that has softened in the heating step to form an ultra-thin glass substrate, wherein the preform has been wound on a cylindrical first winding roll having a roll diameter of 100 mm to 1,500 mm and has a thickness Tp of 20 μm to 250 μm, a width Wp of 10 mm to 2,000 mm, and a length of 1 m to 5,000 m, the ultra-thin glass substrate produced by the drawing step has a thickness Tg of 2 μm to 50 μm, a width Wg of 0.3 mm to 500 mm, and a length of 5 m to 500,000 m, and when a thickness-direction reduction ratio and a width-direction reduction ratio in which the preform is drawn in the drawing step are expressed by Tg/Tp and Wg/Wp, respectively, then the Tg/Tp is from 1/125 to 1/2 and the Wg/Wp is from 1/125 to 1.

(3) The method for manufacturing an ultra-thin glass substrate according to (1) or (2), wherein the preform has been wound on the first winding roll together with a first protective sheet having a thickness of 10 μm to 1,000 μm superposed on one or each surface of the preform, and the method further comprises a protective-sheet peeling step of peeling the first protective sheet from the preform before introducing the preform into the heating step.

(4) The method for manufacturing an ultra-thin glass substrate according to any one of (1) to (3), wherein the drawing step is a step in which drawing is conducted with one or a pair of drawing rolls, and the ultra-thin glass substrate which has undergone the heating step is pulled while keeping the ultra-thin glass substrate in contact with the one drawing roll, or the ultra-thin glass substrate which has undergone the heating step is pulled while gripping the ultra-thin glass substrate with the pair of drawing rolls.

(5) The method for manufacturing an ultra-thin glass substrate according to any one of (1) to (4), wherein, in the heating step, both width-direction ends of the preform that has softened are gripped with gripping rolls.

(6) The method for manufacturing an ultra-thin glass substrate according to any one of (1) to (5), further comprising, after the drawing step, a winding step of winding the ultra-thin glass substrate on a cylindrical second winding roll having a roll diameter of 50 mm to 2,000 mm.

(7) The method for manufacturing an ultra-thin glass substrate according to any one of (4) to (6), wherein, in the drawing step, a second protective sheet having a thickness of 10 μm to 1,000 μm is inserted between the drawing roll and the ultra-thin glass substrate.

(8) The method for manufacturing an ultra-thin glass substrate according to (6) or (7), wherein, after the drawing step, a third protective sheet having a thickness of 10 μm to 1,000 μm is supplied to one or each surface of the ultra-thin glass substrate, and the ultra-thin glass substrate and the third protective sheet are superposed together and wound on the second winding roll.

Advantage of the Invention

According to the invention, it is possible to provide a method in which a continuous preform wound on a cylindrical roll is drawn by a re-drawing process thereby producing a continuous ultra-thin glass substrate with higher productivity than in the conventional re-drawing process in which short-length preforms are used.

MODE FOR CARRYING OUT THE INVENTION

Embodiments of the method for manufacturing an ultra-thin glass substrate of the invention are explained with referring to the drawings.

Figure 1:
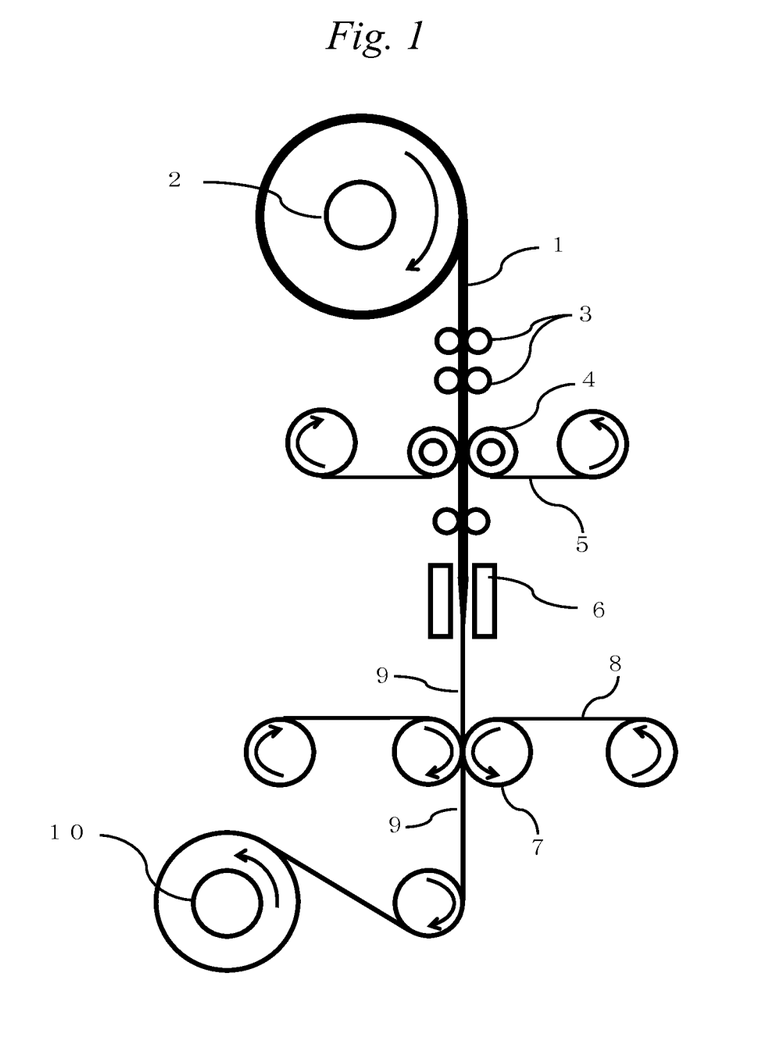
FIG. 1 is a diagrammatic sectional view illustrating an embodiment of the method for manufacturing an ultra-thin glass substrate according to the invention.

In FIG. 1 is shown a diagrammatic sectional view which illustrates an embodiment of the method for manufacturing an ultra-thin glass substrate according to the invention.

In the embodiment shown in FIG. 1, a preform 1 wound on a first winding roll 2 is unwound and sent downward by conveying rolls 3 in a feeding step. Thereafter, in a protective-sheet peeling step, a first protective sheet 5 which is in close contact with one or each surface of the preform 1 is peeled from the preform 1 by one or two protective-sheet peeling rolls 4. In a heating step, the preform 1 is introduced into a heating furnace 6, in which the preform 1 is heated to a temperature around the softening point and softens. In a drawing step, the preform 1 which has softened in the heating furnace 6 is pulled downward and drawn by drawing rolls 7 to give an ultra-thin glass substrate 9. A second protective sheet 8 is inserted between the ultra-thin glass substrate 9 and each drawing roll 7, and the second protective sheet 8 comes into close contact with the surface of the ultra-thin glass substrate 9 to protect the surface of the ultra-thin glass substrate 9. Finally, the ultra-thin glass substrate 9 is wound on a second winding roll 10.

The preform 1 in the invention is explained.

The shape of the preform 1 is not particularly limited, and preferably is substantially rectangular. The thickness of the preform 1 is 20 μm to 250 μm, preferably 30 μm to 200 μm, more preferably 40 μm to 150 μm, even more preferably 50 μm to 100 μm. When the thickness of the preform 1 is 20 μm or more, the preform 1 which has softened in the heating furnace 6 is less apt to break when pulled with the drawing rolls 7. When the thickness of the preform 1 is 250 μm or less, this preform 1 can be wound on the first winding roll 2, which has a small roll diameter, without being damaged.

The width of the preform 1 is 10 mm to 2,000 mm, preferably 20 mm to 1,800 mm, more preferably 30 mm to 1,600 mm, even more preferably 40 mm to 1,400 mm. When the width of the preform 1 is 10 mm or more, the preform 1 which has softened in the heating furnace 6 is less apt to break when pulled with the drawing rolls 7. When the width of the preform 1 is 2,000 mm or less, the device for manufacturing an ultra-thin glass substrate can be reduced in size and the first protective sheet 5 for protecting the preform 1 need not have an increased size and is easily available.

The length of the preform 1 is 1 m to 5,000 m, preferably 2 m to 4,000 m, more preferably 3 m to 3,000 m, even more preferably 5 m to 2,000 m. When the length of the preform 1 is 1 m or more, the ultra-thin glass substrate 9 produced therefrom by a re-drawing process is in a continuous form and the effect of improving productivity is obtained. When the length of the preform 1 is 5,000 m or less, this preform 1 which has been wound on the first winding roll 2 has a small roll diameter and the device for manufacturing an ultra-thin glass substrate can be reduced in size.

The composition of the preform 1 is not particularly limited. For example, the preform 1 may have the same composition as a conventionally known glass containing alkali metal oxides or as a conventionally known alkali-free glass. Preferred of these is an alkali-free glass from the standpoint that the ultra-thin glass substrate 9 obtained therefrom has excellent strength and chemical durability.

Methods for manufacturing the preform 1 are also not particularly limited, and examples thereof include conventionally known processes. For example, a float process, fusion process, slot downdraw process, or updraw process can be applied.

The first winding roll 2 in the invention is explained.

The first winding roll 2 is a roll for winding the preform 1 thereon. It is preferred that the shape of the first winding roll 2 should be cylindrical. The term cylindrical herein means that the roll is substantially cylindrical. The width dimension of the first winding roll 2 is not particularly limited so long as the width dimension thereof is not smaller than the width of the preform 1 from the standpoint of protecting the preform 1.

The roll diameter of the first winding roll 2 is 100 mm to 1,500 mm, preferably 150 mm to 1,000 mm, more preferably 200 mm to 800 mm, even more preferably 300 mm to 500 mm. When the roll diameter thereof is 100 mm or more, the preform 1 can be wound on the first winding roll 2 while maintaining the flexibility of the preform 1. When the roll diameter of the first winding roll 2 is 1,500 mm or less, the preform 1 which has been wound on the first winding roll 2 has a small roll diameter and the device for manufacturing an ultra-thin glass substrate can be reduced in size.

The material of the first winding roll 2 is not particularly limited so long as the first winding roll 2 has rigidity sufficient to prevent the roll 2 from being deformed by the weight of the preform 1 wound thereon.

The preform 1 has been wound on the first winding roll 2 together with a first protective sheet 5 superposed on one or each surface of the preform 1. Consequently, the preform 1 can be prevented from coming into contact with itself or with the first winding roll 2 and suffering surface scratches due to the contact. In case where the preform 1 has a surface scratch, there is a possibility that the preform 1 might break during the production of an ultra-thin glass substrate 9.

The thickness of the first protective sheet 5 is preferably 10 μm to 1,000 μm, more preferably 12 μm to 800 μm, even more preferably 15 μm to 700 μm, most preferably 20 μm to 600 μm. Thicknesses thereof not less than 10 μm are preferred because the first protective sheet 5 having such a thickness has sufficiently high strength and functions to prevent the surfaces of the preform 1 from suffering scratches. Thicknesses of the first protective sheet 5 not more than 1,000 μm are preferred because the preform 1 which has been wound on the first winding roll 2 has a small roll diameter.

Furthermore, it is preferred that the first protective sheet 5 should be peeled from the preform 1 before the preform 1 is introduced into the heating furnace 6. Specifically, it is preferred that the first protective sheet 5 should be peeled from the preform 1 in the vicinity of the heating furnace 6 before the first protective sheet 5 undergoes any change in state, such as softening, melting, or burning.

The material of the first protective sheet 5 is not particularly limited so long as the first protective sheet 5 can protect the surface of the preform 1. Examples thereof include a resin or paper. Examples of the resin include polyester resins, polycarbonate resins, polyethersulfone resins, polyolefin resins, poly(vinyl alcohol) resins, silicone resins, polyamide resins, acrylic resins, polystyrene resins, triacetylcellulose resins, polyimide resins, poly(vinyl chloride) resins and fluororesins. The resin may be a copolymer of any of these resins or may be a resin which contains an additive such as a filler. Examples of the paper include common paper such as woody paper, straw paper, noncombustible paper, and flame-resistant paper. Such paper may have undergone special processing.

Incidentally, the first protective sheet 5 may be configured of two or more layers. In this case, the thickness of the first protective sheet 5 means the total thickness of all layers. In the case where the first protective sheet 5 is composed of two or more layers, the layers may differ in the kind of the constituent resin or paper.

When the preform 1 and the first protective sheet 5 are wound on the first winding roll 2, the preform 1 and the first protective sheet 5 may be in the state of having been merely stacked. Alternatively, the preform 1 and the first protective sheet 5 may be united with each other by bonding force due to an adhesive material or the like or adhesion force attributable to van der Waals force between the solid molecules. It is, however, preferred that the preform 1 and the first protective sheet 5 should be in close contact with each other by the adhesion force, from the standpoint of facilitating the peeling of the first protective sheet 5 from the preform 1 while protecting the surface of the preform 1.

The protective-sheet peeling step is not particularly limited so long as the first protective sheet 5 can be easily peeled from the preform 1 without breaking the preform 1. For example, an adhesive material is applied to the curved surface of each cylindrical peeling roll 4, and the curved surface of the peeling roll 4 is pushed against the surface of the first protective sheet 5 to wind the first protective sheet 5 around the peeling roll 4 while peeling the first protective sheet 5 from the preform 1. Alternatively, a material having adhesion force may be used, in place of the adhesive material, to peel the first protective sheet 5 from the preform 1.

The ultra-thin glass substrate 9 in the invention is explained.

The ultra-thin glass substrate 9 can be manufactured by drawing downward the preform 1 which has softened in the heating furnace 6, by drawing rolls 7. The cross-section of the ultra-thin glass substrate 9 and the cross-section of the preform 1 which has not been heated are of similar shapes; that is, the former has a shape obtained by reducing the size of the latter.

The thickness of the ultra-thin glass substrate 9 is 2 μm to 50 μm, preferably 3 μm to 40 μm, more preferably 5 μm to 30 μm, even more preferably 7 μm to 20 μm. When the thickness of the ultra-thin glass substrate 9 is 2 μm or more, this ultra-thin glass substrate 9 is less apt to break when pulled with the drawing rolls 7. The thickness of the ultra-thin glass substrate 9 is 50 μm or less from the standpoint of weight reduction. Furthermore, by reducing the thickness thereof to 50 μm or less, the possibility that the ultra-thin glass substrate 9 might be broken by stress when bent can be rendered low. The thickness thereof is more preferably 30 μm or less. In addition, when the thickness of the ultra-thin glass substrate 9 is 50 μm or less, it is difficult to produce this ultra-thin glass substrate 9 by a method (e.g., fusion process) other than the manufacturing method of the invention. When the thickness thereof is less than 30 μm, it is impossible to manufacturing this ultra-thin glass substrate 9 by any method, e.g., a fusion process, other than the manufacturing method of the invention. Consequently, the superiority of the invention can be maintained.

The width of the ultra-thin glass substrate 9 is 0.3 mm to 500 mm, preferably 1 mm to 400 mm, more preferably 10 mm to 350 mm, even more preferably 100 mm to 300 mm. When the width of the ultra-thin glass substrate 9 is 0.3 mm or more, this ultra-thin glass substrate 9 is less apt to break when pulled with the drawing rolls 7. When the width of the ultra-thin glass substrate 9 is 500 mm or less, the device for manufacturing an ultra-thin glass substrate and the device for manufacturing products employing the ultra-thin glass substrate 9 can be reduced in size.

The length of the ultra-thin glass substrate 9 is 5 m to 500,000 m, preferably 10 m to 200,000 m, more preferably 20 m to 100,000 m, even more preferably 50 m to 50,000 m. When the length of the ultra-thin glass substrate 9 is 5 m or more, this ultra-thin glass substrate 9 can be produced in a continuous form while attaining high productivity, which is impossible with the thermal bonding of preforms that is employed in the conventional re-drawing process. When the length of the ultra-thin glass substrate 9 is 500,000 m or less, the area required for storing the ultra-thin glass substrate 9 can be reduced and the device for manufacturing products employing the ultra-thin glass substrate 9 can be reduced in size.

When the thickness of the preform 1 and the thickness of the ultra-thin glass substrate 9 are expressed by Tp and Tg, respectively, and the ratio of the thickness-direction drawdown of the preform 1 caused by the drawing rolls 7 is expressed by Tg/Tp, then the value of Tg/Tp is from $1/125$ to $1/2$, preferably from $1/75$ to $1/3$, more preferably from $1/50$ to $1/4$, even more preferably from $1/25$ to $1/5$. When Tg/Tp is $1/125$ or larger, the ultra-thin glass substrate 9 is less apt to break when pulled with the drawing rolls 7. When Tg/Tp is $1/2$ or less, the device for manufacturing an ultra-thin glass substrate and the device for manufacturing products employing the ultra-thin glass substrate 9 can be reduced in size.

When the width of the preform 1 and the width of the ultra-thin glass substrate 9 are expressed by Wp and Wg, respectively, and the ratio of the width-direction drawdown of the preform 1 caused by the drawing rolls 7 is expressed by Wg/Wp, then the value of Wg/Wp is from $1/125$ to $1$, preferably from $1/75$ to $4/5$, more preferably from $1/50$ to $2/3$, even more preferably $1/25$ to $1/2$. When Wg/Wp is $1/125$ or larger, the ultra-thin glass substrate 9 is less apt to break when pulled with the drawing rolls 7. When Wg/Wp is 1 or less, the device for manufacturing an ultra-thin glass substrate and the device for manufacturing products employing the ultra-thin glass substrate 9 can be reduced in size.

Next, an explanation is given on each of the following steps according to the invention, i.e., the feeding step, heating step, drawing step, and step of winding the ultra-thin glass substrate.

The feeding step in the invention is explained.

In the feeding step in the invention, the preform 1 is fed to a production line while being held. The direction in which the preform 1 is held is not limited, and the preform 1 may be fed downward while being held vertically as shown in FIG. 1 or may be fed while being held horizontally. Furthermore, this step is not particularly limited so long as the preform 1 can be conveyed to the heating step without being damaged. Examples include conveying rolls 3, such as those shown in FIG. 1, which convey the preform 1 while gripping both surfaces of the preform 1.

The heating step in the invention is explained.

In the heating step in the invention, the preform 1 sent from the feeding step is heated to a temperature around the softening point in a heating furnace 6 thereby being softened. The heating furnace is not particularly limited so long as the furnace is capable of heating the preform 1 to a temperature around the softening point. Examples thereof include an electric furnace and a gas furnace.

The drawing step in the invention is explained.

The drawing step in the invention is a step in which the preform 1 is drawn by one or a pair of drawing rolls 7. It is preferred that the ultra-thin glass substrate 9 which has undergone the heating step should be pulled while keeping the ultra-thin glass substrate 9 in contact with the one drawing roll 7 or that the ultra-thin glass substrate 9 which has undergone the heating step should be pulled while gripping the ultra-thin glass substrate 9 with the pair of drawing rolls 7. When the drawing rolls 7 rotate while the ultra-thin glass substrate 9 is kept in contact with or is gripped with the drawing roll(s), the rotational torque of the drawing roll(s) 7 acts on the ultra-thin glass substrate, which is pulled thereby. The preform 1 which has softened in the heating step is drawn in accordance with the pulling, thereby giving an ultra-thin glass substrate 9.

Since the preform 1 which has softened is drawn in a free space, an ultra-thin glass substrate 9 having satisfactory surface quality can be produced.

It is preferred that the drawing rolls 7 should have a cylindrical shape. The term cylindrical herein means that the drawing rolls are substantially cylindrical. The width dimension of each drawing roll 7 is not particularly limited so long as the width dimension thereof is not less than the width of the ultra-thin glass substrate 9 to be manufactured. The roll diameter of each drawing roll 7 also is not particularly limited.

The drawing rolls 7 are rotated by a driving device, e.g., an electric motor.

In the case where the drawing step employs one drawing roll 7, the ultra-thin glass substrate 9 which has passed through the heating furnace 6 is bent toward the drawing roll 7 while keeping one surface of the ultra-thin glass substrate 9 in contact with the curved surface of the drawing roll 7, and the drawing roll 7 is rotated. The ultra-thin glass substrate 9 is pulled by the rotational torque which acts on the ultra-thin glass substrate 9 from the drawing roll 7, and the preform 1 which has softened in the heating furnace 6 is drawn in accordance with the pulling, thereby giving an ultra-thin glass substrate 9. The direction in which the ultra-thin glass substrate 9 is bent along the drawing roll 7 is not particularly limited so long as an ultra-thin glass substrate 9 having a desired size is obtained.

In the case where the drawing step employs a pair of drawing rolls 7, the ultra-thin glass substrate 9 which has passed through the heating furnace 6 is inserted between the pair of drawing rolls 7. The pair of drawing rolls 7 is rotated while keeping the curved surfaces of the pair of drawing rolls 7 in contact with the surfaces of the ultra-thin glass substrate. The ultra-thin glass substrate 9 is pulled by the rotational torque which acts on the ultra-thin glass substrate 9 from the pair of drawing rolls 7, and the preform 1 which has softened in the heating furnace 6 is drawn in accordance with the pulling, thereby giving an ultra-thin glass substrate 9.

The pair of drawing rolls 7 operates as a pair of drawing rolls 7 which has a variable gap. With this variable gap, it is possible to cope with specification changes in the thickness of the ultra-thin glass substrate 9.

It is preferred that both width-direction ends of the preform 1 which has softened in the heating step should be gripped with gripping rolls. Although glass substrates having a reduced thickness can be produced by the re-drawing process, there is a problem that these glass substrates have a reduced width. Consequently, by gripping both width-direction ends of the preform 1 which has softened in the heating step, the softened preform 1 can be inhibited from shrinkage in the width direction during the drawing step and an ultra-thin glass substrate 9 having a large width can be produced.

Figure 2A:
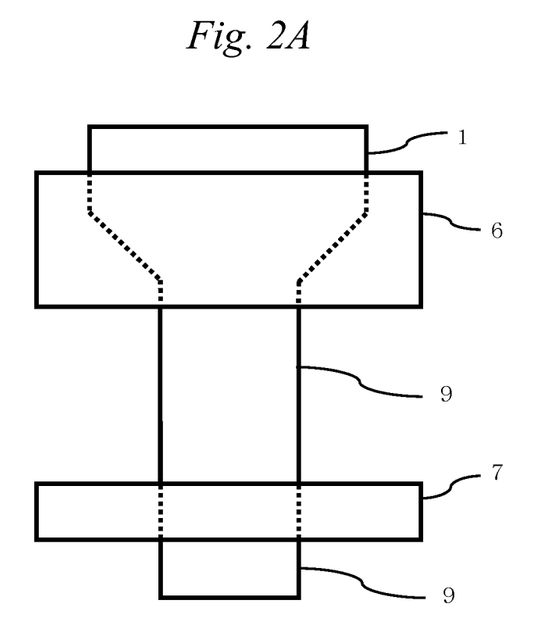
FIG. 2A is a diagrammatic front view illustrating the step of width-direction drawing in the embodiment shown in FIG. 1.
Figure 2B:
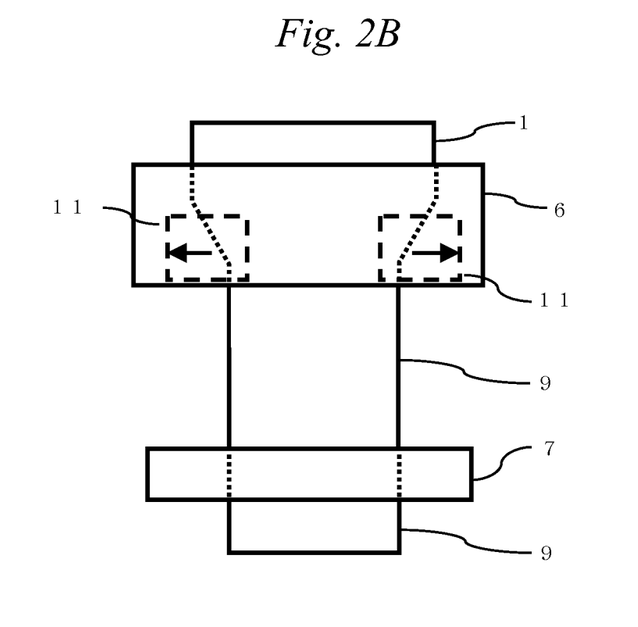
FIG. 2B is a diagrammatic front view illustrating a modification of FIG. 2A.

The gripping rolls are not particularly limited so long as the gripping rolls have a configuration which inhibits the softened preform 1 from shrinkage in the width direction. FIG. 2A is an enlarged diagrammatic front view illustrating the steps ranging from the heating furnace 6 to the drawing rolls 7 in the embodiment shown in FIG. 1. FIG. 2B is a diagrammatic front view of a modification in which a pair of gripping rolls 11 has been added to the heating furnace 6 shown in FIG. 2A. The pair of gripping rolls 11 has a substantially cylindrical shape. The pair of gripping rolls 11 has been disposed in the heating furnace 6 and rotates toward the width-direction outer sides of the preform 1 which has softened in the heating furnace 6, while gripping both width-direction ends of the softened preform 1. By the rotational torque which acts in the width direction of the softened preform 1, the softened preform 1 can be inhibited from shrinkage in the width direction upon drawing. Thus, an ultra-thin glass substrate 9 having a large width can be produced.

It is preferred that in the drawing step, a second protective sheet 8 should be inserted between each drawing roll 7 and the ultra-thin glass substrate 9. The insertion of a second protective sheet 8 between each drawing roll 7 and the ultra-thin glass substrate 9 is intended to prevent the surface of the ultra-thin glass substrate 9 from suffering scratches due to the drawing roll 7.

In the case where the drawing step employs one drawing roll 7, a second protective sheet 8 is inserted between the curved surface of the drawing roll 7 and the one surface of the ultra-thin glass substrate 9. In the case where the drawing step employs a pair of drawing rolls 7, second protective sheets 8 are inserted between the curved surfaces of the pair of drawing rolls 7 and both surfaces of the ultra-thin glass substrate 9. Namely, this step has a configuration in which the ultra-thin glass substrate 9 is sandwiched in the thickness direction between second protective sheets 8.

The width and length of each second protective sheet 8 are not particularly limited so long as the second protective sheet 8 has a size sufficient to protect the surface of the ultra-thin glass substrate 9. It is preferred that the width and length of the second protective sheet 8 should be larger than the width and length, respectively, of the ultra-thin glass substrate 9.

The thickness of the second protective sheet 8 is preferably 10 μm to 1,000 μm, more preferably 12 μm to 800 μm, even more preferably 15 μm to 700 μm, most preferably 20 μm to 600 μm. Thicknesses of the second protective sheet 8 not less than 10 μm are preferred because the second protective sheet 8 having such a thickness has sufficiently high strength and functions to prevent the surface of the ultra-thin glass substrate 9 from being damaged. Thicknesses of the second protective sheet 8 not more than 1,000 μm are preferred because the ultra-thin glass substrate 9 which has been wound on a second winding roll 10 has a small roll diameter.

The kind of the second protective sheet 8 is not particularly limited so long as the second protective sheet 8 has heat resistance which prevents the sheet 8 from suffering burning, ashing, odor emission, or the like due to the heat of the ultra-thin glass substrate 9 in the drawing step and as the sheet 8 can protect the surface of the ultra-thin glass substrate 9. Examples thereof include a heat-resistant resin or heat-resistant paper. Examples of the heat-resistant resin include polyimide resins, fluororesins, polyamide resins, polyaramid resins, polyethersulfone resins, polyetherketone resins, polyetheretherketone resins, poly(ethylene naphthalate) resins, polycarbonate resins, and various liquid-crystal polymer resins. The heat-resistant resin may be a copolymer of any of these resins or may be a resin which contains an additive such as a filler. Examples of the heat-resistant paper include glass-fiber paper, ceramic paper, noncombustible paper, flame-resistant paper, polyester paper, synthetic-resin mixed paper and fluororesin-fiber paper. When the ultra-thin glass substrate 9 in the drawing step has a sufficiently low temperature, the second protective sheet 8 need not have heat resistance. In this case, a sheet of the same kind as the first protective sheet 5 can be used.

Incidentally, the second protective sheet 8 may be composed of two or more layers. In this case, the thickness of the second protective sheet 8 means the total thickness of all layers. In the case where the second protective sheet 8 is composed of two or more layers, the layers may differ in the kind of the constituent resin or paper.

When the ultra-thin glass substrate 9 and the second protective sheet 8 are superposed at the drawing roll 7, the ultra-thin glass substrate 9 and the second protective sheet 8 may be brought into a merely stacked state. Alternatively, the ultra-thin glass substrate 9 and the second protective sheet 8 may be united with each other by any of bonding force due to an adhesive material or the like, adhesion force attributable to van der Waals force between the solid molecules, and thermal-fusion force due to the heat of the ultra-thin glass substrate 9.

The step of winding the ultra-thin glass substrate 9 in the invention is explained.

The step of winding the ultra-thin glass substrate 9 in the invention is a step in which the ultra-thin glass substrate 9 obtained in the drawing step is wound on a second winding roll 10.

It is preferred that the second winding roll 10 should have a cylindrical shape. The term cylindrical herein means that the second winding roll 10 is substantially cylindrical. The width dimension of the second winding roll 10 is not particularly limited so long as the width dimension thereof is not less than the width of the ultra-thin glass substrate 9 from the standpoint of protecting the ultra-thin glass substrate 9.

The roll diameter of the second winding roll 10 is preferably 50 mm to 2,000 mm, more preferably 60 mm to 1,800 mm, even more preferably 70 mm to 1,500 mm, most preferably 90 mm to 1,200 mm. Roll diameters of the second winding roll 10 not less than 50 mm are preferred because the ultra-thin glass substrate 9 can be wound on this second winding roll 10 while maintaining the flexibility of the ultra-thin glass substrate 9. Roll diameters of the second winding roll 10 not more than 2,000 min are preferred because the ultra-thin glass substrate 9 which has been wound on this second winding roll 10 has a small roll diameter and because the device for manufacturing an ultra-thin glass substrate and the device for manufacturing products employing the ultra-thin glass substrate 9 can be reduced in size.

The kind of the second winding roll 10 also is not particularly limited. It is preferred that the second winding roll 10 should have rigidity sufficient to prevent the roll 10 from being deformed by the weight of the ultra-thin glass substrate 9 wound thereon.

In the case where a second protective sheet 8 is not inserted between each drawing roll 7 and the ultra-thin glass substrate 9 in the drawing step, it is preferred that a third protective sheet having a thickness of 10 μm to 1,000 μm (not shown)

should be supplied to one or each surface of the ultra-thin glass substrate 9 after the drawing step and the ultra-thin glass substrate 9 and the third protective sheet(s) superposed thereon should be wound on the second winding roll 10. This is because the ultra-thin glass substrate 9 can be prevented from coming into contact with itself or with the second winding roll 10 and from suffering surface scratches due to the contact. If further protection of the ultra-thin glass substrate 9 is required or if necessary for use of the ultra-thin glass substrate 9, a third protective sheet may be further superposed after a second protective sheet 8 is superposed on one or each surface of the ultra-thin glass substrate 9 in the drawing step.

The thickness of the third protective sheet is preferably 10 μm to 1,000 μm, more preferably 12 μm to 800 μm, even more preferably 15 μm to 700 μm, most preferably 20 μm to 600 μm. Thicknesses of the third protective sheet not less than 10 μm are preferred because the third protective sheet having such a thickness has sufficiently high strength and functions to prevent the surface of the ultra-thin glass substrate 9 from being damaged. Thicknesses of the third protective sheet not more than 1,000 μm are preferred because the ultra-thin glass substrate 9 which has been wound on the second winding roll 10 has a small roll diameter.

The kind of the third protective sheet is not particularly limited so long as the third protective sheet can protect the surface of the ultra-thin glass substrate 9. Examples thereof include the same resins and paper as those for the first and second protective sheets 5 and 8.

Incidentally, the third protective sheet may be composed of two or more layers. In this case, the thickness of the third protective sheet means the total thickness of all layers. In the case where the third protective sheet is composed of two or more layers, the layers may differ in the kind of the constituent resin or paper.

When the ultra-thin glass substrate 9 and the third protective sheet are wound on the second winding roll 10, the ultra-thin glass substrate 9 and the third protective sheet may be in a merely stacked state. Alternatively, the ultra-thin glass substrate and the third protective sheet may be united with each other by bonding force due to an adhesive material or the like or adhesion force attributable to van der Waals force between the solid molecules. It is, however, preferred that the ultra-thin glass substrate 9 and the third protective sheet should be in close contact with each other by the adhesion force, from the standpoint of facilitating the peeling of the third protective sheet from the ultra-thin glass substrate 9 while protecting the surface of the ultra-thin glass substrate 9.

EXAMPLES

Example 1

First, a preform having a thickness of 120 μm, width of 120 mm, and length of 2 m (AN100, manufactured by Asahi Glass Co., Ltd.) is prepared, and the surfaces thereof are cleaned by washing with pure water and UV cleaning. Subsequently, a first PET film having a thickness of 30 μm is superposed on one surface of the preform, and the preform and the first PET film are wound on a cylindrical first winding roll having a roll diameter of 160 mm. Thus, the preform is wound into a roll. The preform is unwound from the first winding roll and introduced into a feeding step in the manufacturing device of an ultra-thin glass substrate. In a protective-sheet removal step, the first PET film is peeled from the preform. The preform from which the first PET film has been peeled is introduced into an electric furnace, the inside of which has been heated to 1,000° C., and the preform is heated to a temperature around the softening point and softened. The part of the ultra-thin glass substrate which has passed through the electric furnace is nipped from both sides between a pair of drawing rolls, and the pair of drawing rolls is rotated to thereby pull the ultra-thin glass substrate. As a result of the pulling of the ultra-thin glass substrate, the preform which has softened in the heating step is drawn to obtain an ultra-thin glass substrate having a thickness of 10 μm, width of 10 mm, and length of 200 m. When the ultra-thin glass substrate is nipped between the pair of drawing rolls in the drawing step, a second PET film having a thickness of 30 μm is inserted between the ultra-thin glass substrate and each drawing roll. As a result, surfaces of the second PET films are brought into close contact with both surfaces of the ultra-thin glass substrate. After the drawing step, the ultra-thin glass substrate is wound on a cylindrical second winding roll having a roll diameter of 160 mm. Since both surfaces of the ultra-thin glass substrate are protected by the second PET films which are in close contact with the surfaces of the ultra-thin glass substrate, the surfaces thereof can be inhibited from suffering scratches which lead to a decrease in strength.

Example 2

A preform having a thickness of 100 μm, width of 50 mm, and length of 100 m (AN100, manufactured by Asahi Glass Co., Ltd.) is prepared, and the surfaces thereof are cleaned by washing with pure water and UV cleaning Subsequently, a first PET film having a thickness of 30 μm is superposed on one surface of the preform, and the preform and the first PET film are wound on a cylindrical first winding roll having a roll diameter of 200 mm. Thus, the preform is wound into a roll. The preform is unwound from the first winding roll and introduced into a feeding step in the manufacturing device for an ultra-thin glass substrate. In a protective-sheet removal step, the first PET film is peeled from the preform. The preform from which the first PET film has been peeled is introduced into an electric furnace, the inside of which has been heated to 1,000° C., and the preform is heated to a temperature around the softening point and softened. One surface of the part of the ultra-thin glass substrate which has passed through the electric furnace is brought into contact with one drawing roll, and this one drawing roll is rotated to thereby pull the ultra-thin glass substrate. As a result of the pulling of the ultra-thin glass substrate, the preform which has softened in the heating step is drawn to obtain an ultra-thin glass substrate having a thickness of 20 μm, width of 10 mm, and length of 2,000 m. When one surface of the ultra-thin glass substrate is brought into contact with the curved surface of the one drawing roll in the drawing step, a second PET film having a thickness of 20 μm is inserted between the one surface of the ultra-thin glass substrate and the curved surface of the drawing roll. As a result, a surface of the second PET film is brought into close contact with the one surface of the ultra-thin glass substrate obtained. After the drawing step, the ultra-thin glass substrate is wound on a cylindrical second winding roll having a roll diameter of 160 mm.

Example 3

A preform having a thickness of 200 μm, width of 1,000 mm, and length of 50 m (AN100, manufactured by Asahi Glass Co., Ltd.) is prepared, and the surfaces thereof are cleaned by washing with pure water and UV cleaning. Subsequently, a first PET film having a thickness of 50 μm is superposed on one surface of the preform, and the preform and the first PET film are wound on a cylindrical first winding roll having a roll diameter of 500 mm. Thus, the preform is wound into a roll. The preform is unwound from the first winding roll and introduced into a feeding step in the manufacturing device for an ultra-thin glass substrate. In a protective-sheet removal step, the first PET film is peeled from the preform. The preform from which the first PET film has been peeled is introduced into an electric furnace, the inside of which has been heated to 1,000° C., and the preform is heated to a temperature around the softening point and softened. The part of the ultra-thin glass substrate which has passed through the electric furnace is nipped from both sides between a pair of drawing rolls, and the drawing rolls are rotated to thereby pull the ultra-thin glass substrate. As a result of the pulling of the ultra-thin glass substrate, the preform which has softened in the heating step is drawn to obtain an ultra-thin glass substrate having a thickness of 30 μm, width of 150 mm, and length of 2,000 m. When the ultra-thin glass substrate is nipped between the pair of drawing rolls in the drawing step, a second PET film having a thickness of 10 μm is inserted between the ultra-thin glass substrate and each drawing roll. As a result, surfaces of the second PET films are brought into close contact with both surfaces of the ultra-thin glass substrate. After the drawing step, the ultra-thin glass substrate is wound on a cylindrical second winding roll having a roll diameter of 300 mm. Since both surfaces of the ultra-thin glass substrate are protected by the second PET films which are in close contact with the surfaces of the ultra-thin glass substrate, the surfaces thereof can be inhibited from suffering scratches which lead to a decrease in strength.

Comparative Example

A preform having a thickness of 50 μm, width of 200 mm, and length of 1 m (AN100, manufactured by Asahi Glass Co., Ltd.) is prepared, and the surfaces thereof are cleaned by washing with pure water and UV cleaning. Subsequently, a first PET film having a thickness of 50 μm is superposed on one surface of the preform, and the preform and the first PET film are wound on a cylindrical first winding roll having a roll diameter of 500 mm. Thus, the preform is wound into a roll. The preform is unwound from the first winding roll and introduced into a feeding step in the manufacturing device for an ultra-thin glass substrate. In a protective-sheet removal step, the first PET film is peeled from the preform. The preform from which the first PET film has been peeled is introduced into an electric furnace, the inside of which has been heated to 1,000° C., and the preform is heated to a temperature around the softening point and softened. The part of the ultra-thin glass substrate which has passed through the electric furnace is nipped from both sides between a pair of drawing rolls, and the drawing rolls are rotated in order that the preform which has softened in the heating step might be drawn into an ultra-thin glass substrate having a thickness of 1 μm. However, the softened preform breaks during the drawing.

While the invention has been described in detail and with reference to specific embodiments thereof, it will be apparent to one skilled in the art that various changes and modifications can be made therein without departing from the spirit and scope thereof.

This application is a Continuation of PCT/JP2010/062443, filed Jul. 23, 2010, which claims priority to Japanese patent application No. 2009-184592 filed on Aug. 7, 2009, and the contents thereof are incorporated herein by reference.

INDUSTRIAL APPLICABILITY

The ultra-thin glass substrate obtained by the manufacturing method of the invention can be used in display devices, electronic papers, touch panels, integrated semiconductor circuits, MEMSs, organic EL illuminators, etc.

DESCRIPTION OF REFERENCE NUMERALS AND SIGNS

1 Preform
2 First winding roll
3 Conveying roll
4 Protective-sheet peeling roll
5 First protective sheet
6 Heating furnace
7 Drawing roll
8 Second protective sheet
9 Ultra-thin glass substrate
10 Second winding roll
11 Gripping roll

The invention claimed is:

1. A method for manufacturing an ultra-thin glass substrate, the method comprising:
    a feeding step of feeding a preform for a glass substrate, previously wound on a cylindrical first winding roll, to a production line by unwinding the preform from the cylindrical first winding roll;
    a heating step of heating the preform fed from the feeding step to a temperature around a softening point thereof; and
    a drawing step of drawing the preform that has softened in the heating step to form an ultra-thin glass substrate.

2. The method for manufacturing an ultra-thin glass substrate according to claim 1, wherein the preform has been wound on the first winding roll together with a first protective sheet having a thickness of 10 μm to 1,000 μm superposed on one or each surface of the preform, and
    the method further comprises a protective-sheet peeling step of peeling the first protective sheet from the perform before introducing the preform into the heating step.

3. The method for manufacturing an ultra-thin glass substrate according to claim 1, wherein the drawing step is a step in which drawing is conducted with one or a pair of drawing rolls, and
    the ultra-thin glass substrate which has undergone the heating step is pulled while keeping the ultra-thin glass substrate in contact with the one drawing roll, or the ultra-thin glass substrate which has undergone the heating step is pulled while gripping the ultra-thin glass substrate with the pair of drawing rolls.

4. The method for manufacturing an ultra-thin glass substrate according to claim 1, wherein, in the heating step, both width-direction ends of the preform that has softened are gripped with gripping rolls.

5. The method for manufacturing an ultra-thin glass substrate according to claim 1, further comprising, after the drawing step,
    a winding step of winding the ultra-thin glass substrate on a cylindrical second winding roll having a roll diameter of 50 mm to 2,000 mm.

6. The method for manufacturing an ultra-thin glass substrate according to claim 3, wherein, in the drawing step, a second protective sheet having a thickness of 10 μm to 1,000 μm is inserted between the drawing roll and the ultra-thin glass substrate.

7. The method for manufacturing an ultra-thin glass substrate according to claim 5, wherein, after the drawing step, a third protective sheet having a thickness of 10 μm to 1,000 μm is supplied to one or each surface of the ultra-thin glass substrate, and the ultra-thin glass substrate and the third protective sheet are superposed together and wound on the second winding roll.

8. A method for manufacturing an ultra-thin glass substrate, the method comprising:
a feeding step of feeding a preform for a glass substrate, previously wound on a cylindrical first winding roll, to a production line by unwinding the preform from the cylindrical first winding roll;
a heating step of heating the preform fed from the feeding step to a temperature around a softening point thereof; and
a drawing step of drawing the preform that has softened in the heating step to form an ultra-thin glass substrate,
wherein the cylindrical first winding roll has a roll diameter of 100 mm to 1,500 mm, a thickness Tp of 20 μm to 250 μm, a width Wp of 10 mm to 2,000 mm, and a length of 1 m to 5,000 m,
the ultra-thin glass substrate produced by the drawing step has a thickness Tg of 2 μm to 50 μm, a width Wg of 0.3 mm to 500 mm, and a length of 5 m to 500,000 m, and
when a thickness-direction reduction ratio and a width-direction reduction ratio in which the preform is drawn in the drawing step are expressed by Tg/Tp and Wg/Wp, respectively, then the Tg/Tp is from 1/125 to 1/2 and the Wg/Wp is from 1/125 to 1.

9. The method for manufacturing an ultra-thin glass substrate according to claim 8, wherein the preform has been wound on the first winding roll together with a first protective sheet having a thickness of 10 μm to 1,000 μm superposed on one or each surface of the preform, and
the method further comprises a protective-sheet peeling step of peeling the first protective sheet from the preform before introducing the preform into the heating step.

10. The method for manufacturing an ultra-thin glass substrate according to claim 8, wherein the drawing step is a step in which drawing is conducted with one or a pair of drawing rolls, and
the ultra-thin glass substrate which has undergone the heating step is pulled while keeping the ultra-thin glass substrate in contact with the one drawing roll, or the ultra-thin glass substrate which has undergone the heating step is pulled while gripping the ultra-thin glass substrate with the pair of drawing rolls.

11. The method for manufacturing an ultra-thin glass substrate according to claim 8, wherein, in the heating step, both width-direction ends of the preform that has softened are gripped with gripping rolls.

12. The method for manufacturing an ultra-thin glass substrate according to claim 8, further comprising, after the drawing step,
a winding step of winding the ultra-thin glass substrate on a cylindrical second winding roll having a roll diameter of 50 mm to 2,000 mm.

13. The method for manufacturing an ultra-thin glass substrate according to claim 10, wherein, in the drawing step, a second protective sheet having a thickness of 10 μm to 1,000 μm is inserted between the drawing roll and the ultra-thin glass substrate.

14. The method for manufacturing an ultra-thin glass substrate according to claim 12, wherein, after the drawing step, a third protective sheet having a thickness of 10 μm to 1,000 μm is supplied to one or each surface of the ultra-thin glass substrate, and the ultra-thin glass substrate and the third protective sheet are superposed together and wound on the second winding roll.

* * * * *